US006882062B2

United States Patent
Kleibaumhueter et al.

(10) Patent No.: US 6,882,062 B2
(45) Date of Patent: Apr. 19, 2005

(54) POWER SUPPLY MANAGEMENT IN PAPER-PROCESSING MACHINES

(75) Inventors: Klaus Dieter Kleibaumhueter, Bad Schoenborn (DE); Helmut Meyer, Wiesloch (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 11 days.

(21) Appl. No.: 10/340,469

(22) Filed: Jan. 10, 2003

(65) Prior Publication Data
US 2003/0160511 A1 Aug. 28, 2003

(30) Foreign Application Priority Data
Jan. 18, 2002 (DE) .......................................... 102 01 765

(51) Int. Cl.[7] ................................................. H02J 1/00
(52) U.S. Cl. ............................ 307/32; 307/59; 323/267
(58) Field of Search ...................... 363/16, 98; 323/246, 323/247, 267, 346; 307/12, 17, 31, 32, 35, 38, 59, 75

(56) References Cited

U.S. PATENT DOCUMENTS 5,907,236 A * 5/1999 James ......................... 323/255
6,111,768 A * 8/2000 Curtiss ......................... 363/98

FOREIGN PATENT DOCUMENTS

| DE | 4013506 | 10/1991 |
| DE | 19600110 | 7/1997 |
| JP | 06327146 | 11/1994 |
| JP | 10248163 | 9/1998 |
| JP | 2001119856 | 4/2001 |

* cited by examiner

Primary Examiner—Jessica Han
(74) Attorney, Agent, or Firm—Davidson, Davidson & Kappel, LLC

(57) ABSTRACT

A device for supplying voltage to an electrical machine, in particular a paper-processing machine, having a plurality of electric drives (11, 12, 21, 22, 32), electric drives (11, 12) of the same supply voltage being combined into one voltage level (14, 23, 33). The voltage supply device is characterized in that provision is made for a first DC voltage level (14) having electric drives (11, 12) as well as an electrical component (1, 13) for dissipating surplus electric energy, and provision is made for at least one second DC voltage level (23) which is connected to the first voltage level (14) via a bidirectional voltage transformer (2) and has further electric drives (21, 22), and one of the voltage levels (14, 23) is connected to the mains supply (4) via a voltage transformer (1).

18 Claims, 1 Drawing Sheet

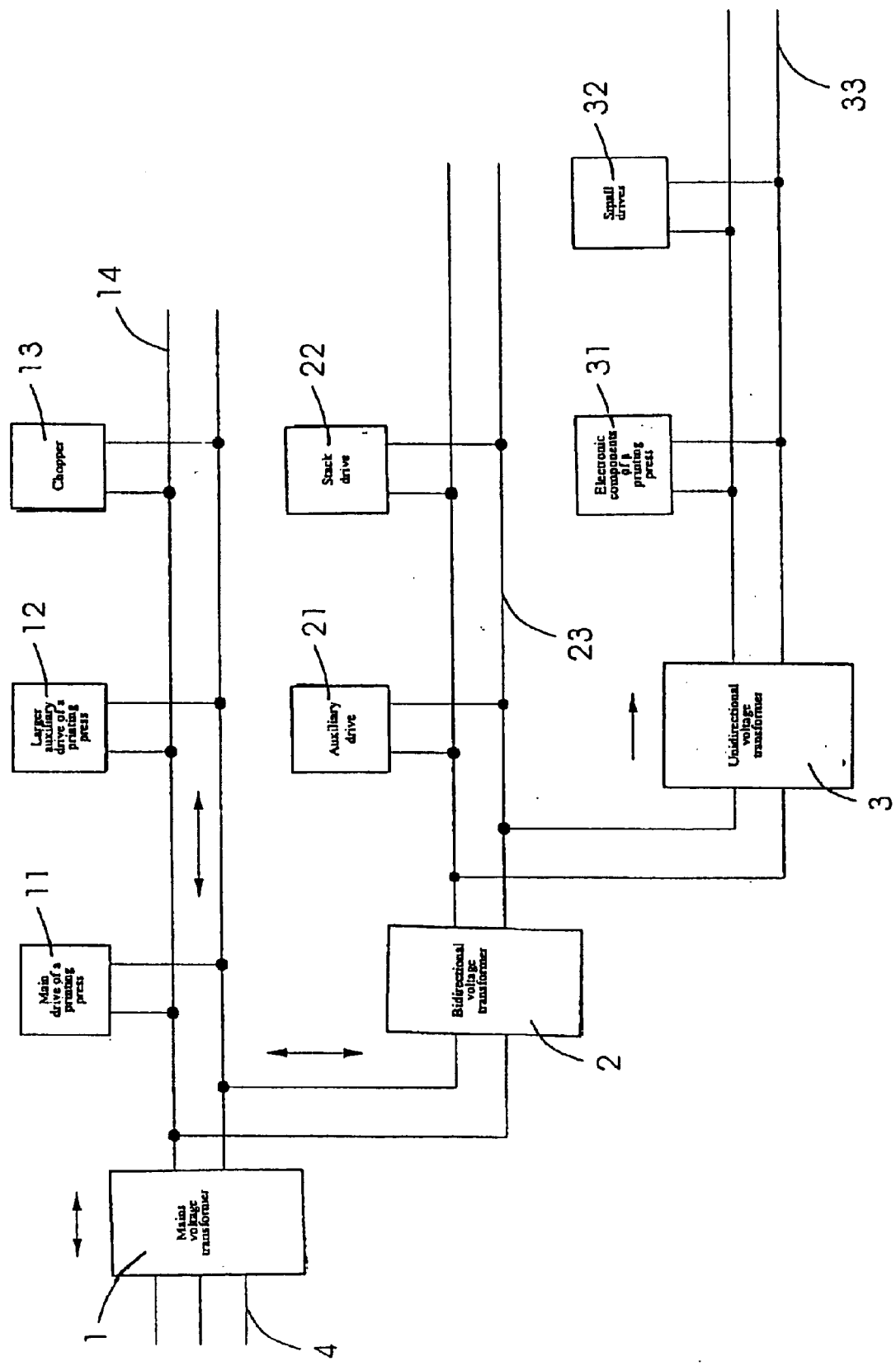

POWER SUPPLY MANAGEMENT IN PAPER-PROCESSING MACHINES

Priority to German Patent Application No. 102 01 765.4, filed Jan. 18, 2001 and hereby incorporated by reference herein, is claimed.

BACKGROUND INFORMATION

The present invention relates to a device for supplying voltage to an electrical machine, in particular a paper-processing machine, having a plurality of electric drives, electric drives of the same supply voltage being combined into one voltage level.

Printing presses and folding machines have a plurality of electric drives. In this context, the power of the electric drives is of different orders of magnitude, depending on the task an electric drive has. So, first of all, there are the main drive and larger auxiliary drives of a printing press, which have powers in the range of 1–100 KW. Below that, in terms of power, come the smaller auxiliary drives and the drives for actuating the stacks at the feeder and the delivery, having powers of several hundred watts. A further group is constituted by the small drives with a power of several watts and the supply of the electronics. Since the mentioned drives work in different power classes, they have different power supplies as well. Therefore, the drives of one power category were combined into a voltage level, and this voltage level was connected to the usually existing three-phase system. This results in that the main and larger auxiliary drives are supplied with a relatively high voltage which is produced by transforming the mains voltage, that the smaller auxiliary drives are supplied with a medium voltage, and that the small drives and the electronics are supplied with a low voltage. In this context, each of these voltage levels is provided with a separate mains connection, i.e., in each case, one voltage transformer is required which converts the mains voltage to the required voltage level. Since the main and auxiliary drives of a printing press or folding machine can also operate regeneratively, it must be made possible for surplus electric energy either to be fed back from the main and auxiliary drives of a printing press or folding machine into the mains supply or to be converted to heat using electrical resistors (choppers) to be switched in. This results in that each voltage level in which drives can also be operated regeneratively must be provided with a chopper for removing peak loads or that, in each case, a so-called "feedback unit" must exist between a voltage level and the mains supply to allow electric energy to flow back from the voltage level to the mains supply.

BRIEF SUMMARY OF THE INVENTION

An object of the present invention is to provide a voltage supply concept for a paper-processing machine, ensuring that when the main and auxiliary drives of a paper-processing machine are operated regeneratively, surplus electric energy can be removed without having to destroy an unnecessarily large amount of electric energy in a chopper.

The present invention provides a device for supplying voltage to an electrical machine, in particular a paper-processing machine, having a plurality of electric drives (11, 12, 21, 22, 32), electric drives (11, 12) of the same supply voltage being combined into one voltage level (14), wherein provision is made for a first DC voltage level (14) having electric drives (11, 12) as well as an electrical component (1, 13) for dissipating surplus electric energy. Provision is also made for at least one second DC voltage level (23) which is connected to the first voltage level (14) via a bidirectional voltage transformer (2) and has further electric drives (21, 22). One of the voltage levels (14, 23) is connectable to the mains supply (4) via a voltage transformer (1).

The main and auxiliary drives used in printing presses are predominantly rotating-field motors. The converters are fed with DC voltage. Since not all of these electric drive motors work with the same operating voltage, they have to be supplied with different DC voltages. However, the conversion of a DC voltage to another DC voltage involves much more effort than is required when converting an AC voltage to another AC voltage. The coupling of a first DC voltage level featuring electric drives of high electric power with a second DC voltage level featuring electric drives of relatively low electric power results in that the energy of regeneratively operated electric drives does not have to be immediately destroyed in a chopper for removing peak loads or fed back into the mains supply, but that the electric energy is first passed on to motively operating electric drives, also of another voltage level. To this end, the first voltage level is connected to the second voltage level via a bidirectional voltage transformer so that electric energy can be exchanged both from the first voltage level to the second voltage level and vice versa. One of the two voltage levels is also connected into the mains supply via a mains voltage transformer. If the electric drives of the first voltage level predominantly operate regeneratively, then the electric energy is initially delivered to the second voltage level where the auxiliary drives can consume this electric energy. Only when this is no longer possible, i.e., when the auxiliary drives of the second voltage level cannot consume enough energy either, is the surplus energy consumed in a chopper for removing peak loads at the first voltage level. In this case, however, no electric energy needs to be fed back into the mains supply so that the mains voltage transformer needs to feed only unidirectionally in one direction, namely into the printing press. In this manner, it is possible for the mains voltage transformer to have a more cost-effective design because it does not have to be able to feed back into the mains. It is, of course, also possible for the mains voltage transformer to have a bidirectional design so that electric energy can be fed back into the mains supply, as a result of which, on the other hand, no chopper is needed then. Thus, each printing press needs to have only one mains voltage transformer.

In a further embodiment, provision is made for at least one further voltage level which is used for supplying voltage to small loads or electronic circuits and which is connected to the first voltage level or to the second voltage level via a further voltage transformer. The small loads and electronic circuits combined into this third voltage level constitute the so-called "base load" of a printing press or folding machine, i.e., these drives, power supply units for supplying the electronics and other loads constantly consume electric energy as soon as a printing press or folding machine is put into operation. Therefore, it is clear that the drives and circuits of the third voltage level constantly operate motively, i.e., consume electric energy; regenerative operation is not possible here. By being connected to the first or second voltage level via a further voltage transformer, this third voltage level with the base load ensures that when the balance of electric energy at the first and second voltage levels together yields a surplus, this surplus electric energy is first passed on to the third voltage level of the base load before peak load is removed in the chopper of the first voltage level. That is, electric energy is only destroyed in the chopper when the energy consumption of the base load and the motively operating drives of a printing press or folding machine is smaller than the energy generation in the regeneratively operated drives. Moreover, the third voltage level does not need a separate mains connection either, but is simply connected to the first or second voltage level via a voltage transformer. Moreover, it is mentioned that the whole voltage supply concept is, of course, not limited to three voltage levels. An arbitrary number of voltage levels can be present. If n voltage levels are present, then the $n^{th}$ voltage level represents the voltage level of the small loads which is connected to the remaining n-1 voltage levels via a unidirectional transformer while among the n-1 voltage levels, electric energy can be exchanged as needed via bidirectional voltage transformers.

In a further embodiment of the present invention, the voltage transformer between the first and third voltage levels or the second and third voltage levels is designed as a unidirectional transformer. Such a unidirectional transformer is less expensive than a bidirectional transformer and is absolutely sufficient in this case because the third voltage level always consumes electric energy, which is why no electric energy has to be fed back from the third voltage level to the other voltage levels.

Moreover, in order to supply voltage to one of the n-1 voltage levels, it turns out to be advantageous to provide a unidirectional voltage transformer which connects the one voltage level to a mains supply. Since, due to the above-mentioned measures, no electric energy needs to be fed back from the different voltage levels of the printing press into the mains supply, here too, a unidirectional voltage transformer can be used between the mains and the voltage supply levels for reasons of cost.

However, in times of constantly increasing cost of energy and, consequently, also of electricity it can turn out to be advantageous if the mains voltage transformer has a bidirectional design. In this case, the chopper for removing peak loads can be dispensed with because surplus electric energy can be fed back into the mains supply.

BRIEF DESRIPTION OF THE DRAWING

The present invention is now described and illustrated in greater detail with reference to the drawing, in which:

FIG. 1 shows the voltage supply concept according to the present invention, including several voltage levels, drives, voltage transformers and one element for removing surplus energy.

DETAILED DESCRIPTION

Paper-processing machines, such as printing presses and folding machines, are usually connected to the 400 Volt three-phase system. This is also true for the voltage supply concept shown in FIG. 1, which is composed of three DC voltage levels of a printing press. In this context, the three-phase current from mains 4 is fed to a voltage transformer 1 which converts the three-phase current to a DC voltage. To this end, voltage transformer 1 is designed either as a diode rectifier or as a half-controlled bridge if it operates unidirectionally, i.e., converts AC voltage from the mains to DC voltage. However, voltage transformer 1 can also be designed as a fully controlled bridge; then it operates bidirectionally and is able to convert both mains voltage to DC voltage and DC voltage to mains voltage. Voltage transformer 1 then allows electric energy to flow from three-phase system 4 into the printing press and vice versa. A first voltage having a value between 400 and 700 Volts is present at the output of voltage transformer 1, constituting a first voltage level 14. First voltage level 14 serves for supply to large electric loads of a printing press. In particular, the main drive or drives 11, which drive(s) the printing and transport cylinders of the printing press, as well as possible larger auxiliary drives 12, which drive, for example, individual printing or transport cylinders, are considered as the large loads of a printing press. Moreover, a so-called "chopper" 13, which is a switchable electrical resistor, is present at first voltage level 14, allowing surplus electric energy present at first voltage level 14 to be removed if mains voltage transformer 1 is only designed as a half-controlled bridge. If mains voltage transformer 1 operates only as a half-controlled bridge and, consequently, can only feed in one direction, then this chopper 13 for removing peak loads is indispensable, in particular, when main drive 11 or larger auxiliary drives 12 of the printing press operate in regenerative mode. However, if mains voltage transformer 1 is designed as a fully controlled bridge, then chopper 13 is not necessarily required and can be dispensed with because surplus electric energy can be fed back from the DC voltage level of the printing press into the three-phase system.

First voltage level 14 is connected to a second voltage level 23 via a bidirectionally operating voltage transformer 2. In this manner, the DC voltage of first voltage level 14 is converted to a lower DC voltage of second voltage level 23. To allow electric energy to be exchanged both from first voltage level 14 to second voltage level 23 and vice versa, DC voltage transformer 2, which connects the two voltage levels 14, 23, operates bidirectionally, i.e., it is able to exchange electric energy in both directions. Moreover, bidirectional voltage transformer 2 has the task of producing a nearly constant DC voltage which allows electronic components and drives 21, 22 connected to the second voltage level to be set to an operating point. This means that the DC voltage of second voltage level 23 always assumes a constant value, even when there are fluctuations in the DC voltage of first voltage level 14. Also connected to second voltage level 23 are all auxiliary drives 21 that operate regeneratively. Stack drives 22, which control the feeder and the delivery of a printing press, are also connected to the second voltage level.

In addition, a third voltage level 33 is also connected to second voltage level 23 via a DC voltage transformer 3. However, this DC voltage transformer 3 operates only in one direction so that electric energy can only be carried away from second voltage level 23 to third voltage level 33. The voltage of third voltage level 23 is in the range of 24 V DC voltage, which is mainly used for operating electronic components 31 and small drives 32 having low electric power. Since electronic circuits 31 and small drives 32 have to be constantly supplied with current for as long as a printing press or a folding machine is in operation, these components constitute the so-called "base load" of the machine. This base load, which results in a continuous positive power consumption at third voltage level 33, allows DC voltage transformer 3 between the second and third voltage levels to be designed as a unidirectional transformer because electric energy needs to flow exclusively from the second to the third voltage level.

Using the voltage supply concept shown in FIG. 1, it is thus possible to interconnect three different voltage levels 14, 23, 33 which are connected to a three-phase system 4, without the need for the three voltage levels to feed back into the mains and without requiring more than one chopper 13 for removing peak loads although drives which operate both regeneratively and motively are present at least at two levels of the voltage supply device.

While the machine may be a paper processing machine it may also be a machine which processes other printing materials, for example, plastics.

List of reference numerals
1 mains voltage transformer
11 main drive of a printing press
12 larger auxiliary drive of a printing press
13 chopper
14 first voltage level system
2 bidirectional voltage transformer
21 auxiliary drive
22 stack drive
23 second voltage level system
3 unidirectional voltage transformer
31 electronic components of a printing press
32 small drives
33 third voltage level system
4 three-phase system

What is claimed is:

1. A device for supplying voltage to a printing material-processing machine having a plurality of electrical drives, the device comprising:
   a first DC voltage level system having first electric drives and an electrical component for dissipating surplus electric energy,
   a second DC voltage level system having second electric drives; and
   a bidirectional voltage transformer connecting the first and second DC voltage level systems; and
   a further voltage transformer for connecting one of the first and second voltage level systems to a mains supply.

2. The voltage supply device as recited in claim 1 wherein n voltage level systems are present, the n voltage level systems including the first and second voltage level systems, n-1 voltage level systems of the n voltage level systems being transformer-interconnected bidirectionally and the $n^{th}$ voltage level system of the n voltage level systems being transformer connected unidirectionally to one of the n-1 voltage levels.

3. The voltage supply device as recited in claim 2 wherein n is three or greater.

4. The voltage supply device as recited in claim 1 further comprising a third voltage level system and a unidirectional voltage transformer, the first or second voltage level system being connected to the third voltage level system via the unidirectional voltage transformer.

5. The voltage supply device as recited in claim 1 wherein the further voltage transformer connected is unidirectional.

6. The voltage supply device as recited in claim 1 wherein the further voltage transformer is bidirectional.

7. The voltage supply device as recited in claim 4 wherein the third voltage level system is a DC voltage system.

8. The device as recited in claim 1 wherein the first electric drives include main and auxiliary printing press drives having a power of 1kW to 100 kW.

9. A printing press or folding machine having at least one voltage supply device, the voltage supply device including:
   a first DC voltage level system having first electric drives and an electrical component for dissipating surplus electric energy,
   a second DC voltage level system having second electric drives;
   a bidirectional voltage transformer connecting the first and second DC voltage level systems; and
   a further voltage transformer for connecting one of the first and second voltage level systems to a mains supply.

10. A device for supplying voltage to a printing material-processing machine having a plurality of electrical drives, the device comprising:
    a first DC voltage level system having first electric motors and an electrical component for dissipating surplus electric energy,
    a second DC voltage level system having second electric motors; and
    a bidirectional voltage transformer connecting the first and second DC voltage level systems; and
    a further voltage transformer for connecting one of the first and second voltage level systems to a mains supply.

11. The voltage supply device as recited in claim 10 wherein n voltage level systems are present, the n voltage level systems including the first and second voltage level systems, n-1 voltage level systems of the n voltage level systems being transformer-interconnected bidirectionally and the $n^{th}$ voltage level system of the n voltage level systems being transformer connected unidirectionally to one of the n-1 voltage levels.

12. The voltage supply device as recited in claim 11 wherein n is three or greater.

13. The voltage supply device as recited in claim 10 further comprising a third voltage level system and a unidirectional voltage transformer, the first or second voltage level system being connected to the third voltage level system via the unidirectional voltage transformer.

14. The voltage supply device as recited in claim 13 wherein the third voltage level system is a DC voltage system.

15. The voltage supply device as recited in claim 10 wherein the further voltage transformer is bidirectional.

16. The voltage supply device as recited in claim 10 wherein the further voltage transformer connected is unidirectional.

17. The device as recited in claim 10 wherein the first electric motors include main and auxiliary printing press motors having a power of 1kW to 100kW.

18. The device as recited in claim 10 wherein the first electric motors are rotating-field motors.

* * * * *